(12) United States Patent
Cheve et al.

(10) Patent No.: US 10,704,990 B2
(45) Date of Patent: Jul. 7, 2020

(54) SPACER AND SENSOR MODULE FOR DETECTING A VIBRATIONAL BEHAVIOR OF A MECHANICAL COMPONENT INCLUDING THE SPACER

(71) Applicant: Aktiebolaget SKF, Gothenburg (SE)

(72) Inventors: Olivier Cheve, Chanceaux-sur-choisille (FR); Johannes Biegner, Prichsenstadt (DE); Jens Graf, Schweinfurt (DE); Simon Hubert, Saint Cyr sur Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 212 days.

(21) Appl. No.: 15/919,298

(22) Filed: Mar. 13, 2018

(65) Prior Publication Data
US 2019/0285513 A1 Sep. 19, 2019

(51) Int. Cl.
*G01M 17/013* (2006.01)
(52) U.S. Cl.
CPC .................. *G01M 17/013* (2013.01)
(58) Field of Classification Search
CPC ...... G01M 1/22; G01M 1/225; G01M 17/013; G01H 11/08; B60C 2019/004
See application file for complete search history.

(56) References Cited

U.S. PATENT DOCUMENTS

| 1,555,138 | A | * | 9/1925 | Main | B60B 3/16 |
| | | | | | 301/63.109 |
| 2,043,845 | A | * | 6/1936 | Thearle | G01M 1/22 |
| | | | | | 73/466 |
| 2,382,843 | A | * | 8/1945 | Annis | G01M 1/22 |
| | | | | | 73/465 |
| 3,158,032 | A | * | 11/1964 | Lannen | G01M 1/22 |
| | | | | | 73/485 |
| 3,732,737 | A | * | 5/1973 | Forster | G01M 1/225 |
| | | | | | 73/462 |
| 3,740,807 | A | * | 6/1973 | Getts | B23B 27/1662 |
| | | | | | 407/104 |
| 3,774,456 | A | * | 11/1973 | Crump | G01M 1/22 |
| | | | | | 73/462 |
| 3,854,183 | A | * | 12/1974 | Roos | B23B 27/1662 |
| | | | | | 407/104 |
| 4,044,440 | A | * | 8/1977 | Stier | B23B 27/1662 |
| | | | | | 407/105 |

(Continued)

*Primary Examiner* — David J Bolduc
(74) *Attorney, Agent, or Firm* — J-Tek Law PLLC; Scott T. Wakeman; Mark A. Ussai

(57) ABSTRACT

A sensor module configured to detect a vibration of a mechanical component includes a base connectable to the mechanical component, at least one spacer extending from the base, and a circuit board connected to the base by the spacer such that a mechanical vibration is transmitted from the component to the base to the spacer to the circuit board. The circuit board includes a circuit and wirelessly transmits signals indicative of a detected vibration. The spacer includes a body portion and a pin portion projecting from an end of the body portion. The pin portion extends into the at least one hole, and the body portion is blocked from passing though the at least one hole by contact with a region of a first side of the circuit board surrounding the at least one hole.

20 Claims, 7 Drawing Sheets

(56) References Cited

U.S. PATENT DOCUMENTS

| | | | | |
|---|---|---|---|---|
| 4,237,454 | A * | 12/1980 | Meyer | G01H 1/003 310/323.21 |
| 4,255,163 | A * | 3/1981 | Sonderegger | G01M 1/323 451/343 |
| 4,373,378 | A * | 2/1983 | Fujishiro | G01L 23/222 310/329 |
| 4,374,472 | A * | 2/1983 | Nishimura | G01H 11/08 73/35.11 |
| 4,427,322 | A * | 1/1984 | Kroll | B23B 27/1662 407/105 |
| 4,489,607 | A * | 12/1984 | Park | G01M 1/045 73/462 |
| 4,621,263 | A * | 11/1986 | Takenaka | G01H 1/00 340/683 |
| 4,727,279 | A * | 2/1988 | Peng | G01P 15/0922 310/321 |
| 4,817,003 | A * | 3/1989 | Nagase | B24B 41/042 700/164 |
| 5,703,295 | A * | 12/1997 | Ishida | G01H 1/003 310/339 |
| 6,259,372 | B1 * | 7/2001 | Taranowski | G01M 13/045 340/539.1 |
| 7,144,205 | B2 * | 12/2006 | Sheffler | B23C 5/2221 407/103 |
| 7,254,994 | B2 * | 8/2007 | Schulze | B60C 23/0408 73/146 |
| 7,256,505 | B2 * | 8/2007 | Arms | B60C 23/0411 290/1 R |
| 8,250,924 | B2 * | 8/2012 | Hedtke | G01H 11/08 73/660 |
| 8,866,634 | B2 * | 10/2014 | Williamson | G01D 4/004 340/870.02 |
| 10,422,723 | B2 | 9/2019 | Renegar | G01M 17/013 |
| 2001/0047686 | A1 * | 12/2001 | Baba | G01H 1/00 73/504.12 |
| 2004/0078662 | A1 * | 4/2004 | Hamel | B60C 23/0411 714/22 |
| 2004/0102880 | A1 * | 5/2004 | Brown | G01M 17/013 701/31.4 |
| 2005/0087019 | A1 * | 4/2005 | Face | G01N 29/14 73/649 |
| 2006/0028326 | A1 * | 2/2006 | Haas | B60C 23/0408 340/426.33 |
| 2006/0272420 | A1 * | 12/2006 | Serrano | F16F 15/00 73/649 |
| 2007/0119257 | A1 * | 5/2007 | Hayasaka | G01H 11/08 73/649 |
| 2008/0100176 | A1 * | 5/2008 | Haskell | G01H 11/08 310/313 R |
| 2009/0139327 | A1 * | 6/2009 | Dagh | G01M 1/225 73/457 |
| 2009/0169384 | A1 * | 7/2009 | Storace | G01M 1/22 416/145 |
| 2010/0246130 | A1 * | 9/2010 | Paquette | E05D 3/022 361/704 |
| 2010/0256874 | A1 * | 10/2010 | Carresjo | B60C 23/0416 701/48 |
| 2010/0274441 | A1 * | 10/2010 | Carresjo | B60C 23/0416 701/31.4 |
| 2010/0274607 | A1 * | 10/2010 | Carresjo | B60C 23/0416 705/7.11 |
| 2012/0274461 | A1 * | 11/2012 | Colombo | B60C 23/0408 340/447 |
| 2013/0276541 | A1 * | 10/2013 | Busch | G01H 1/12 73/649 |
| 2014/0326062 | A1 * | 11/2014 | Weston | G01M 17/02 73/146 |
| 2015/0202734 | A1 * | 7/2015 | Trionfetti | G01M 1/36 451/177 |
| 2015/0236610 | A1 * | 8/2015 | Sasaki | H02M 7/06 73/649 |
| 2015/0276556 | A1 * | 10/2015 | Biegner | G01L 17/005 73/584 |
| 2015/0280616 | A1 * | 10/2015 | Naito | G01P 15/0922 73/658 |
| 2015/0355216 | A1 * | 12/2015 | Girardeau | G01H 11/08 73/514.29 |
| 2016/0097674 | A1 * | 4/2016 | Zusman | G01H 11/08 73/658 |
| 2016/0123797 | A1 * | 5/2016 | Kishi | G01H 11/08 356/30 |
| 2016/0325592 | A1 * | 11/2016 | Tomakidi | B60C 23/0471 |
| 2017/0030944 | A1 * | 2/2017 | Yao | G01H 11/08 |
| 2018/0003591 | A1 * | 1/2018 | Renegar | G01M 7/027 |
| 2018/0191231 | A1 * | 7/2018 | Saibal | H02K 35/02 |
| 2019/0154491 | A1 * | 5/2019 | Bunner | G01G 19/12 |

\* cited by examiner

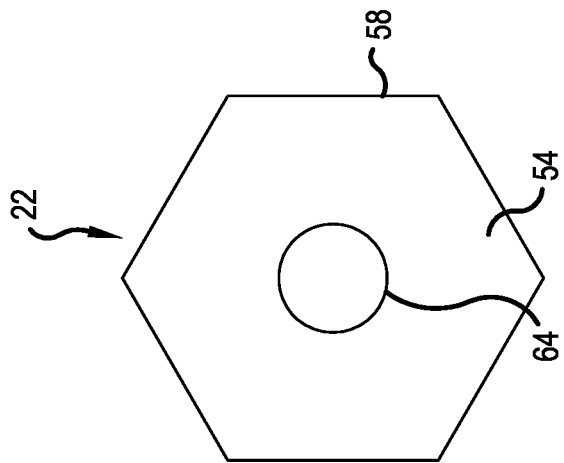
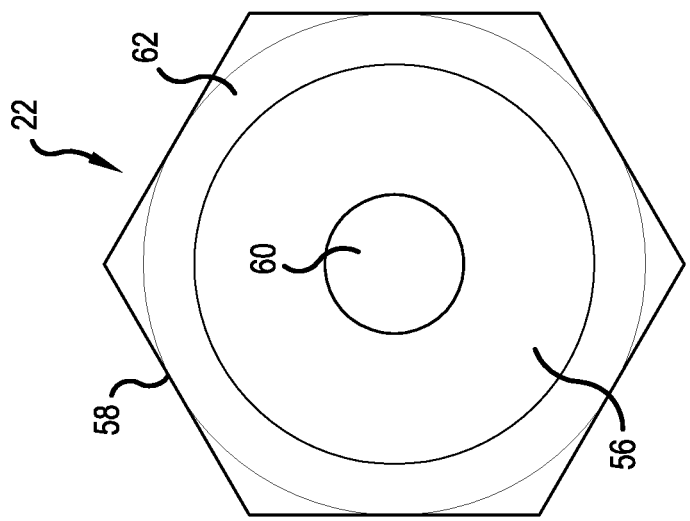
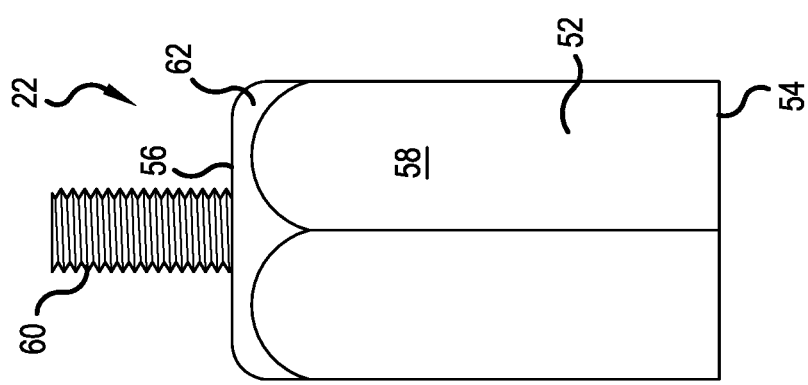

SPACER AND SENSOR MODULE FOR DETECTING A VIBRATIONAL BEHAVIOR OF A MECHANICAL COMPONENT INCLUDING THE SPACER

TECHNOLOGICAL FIELD

The present disclosure is directed to a sensor module for detecting a vibrational behavior of a mechanical component, and, more specifically, toward a sensor module for detecting a vibrational behavior of a vehicle wheel, which sensor module is mountable on the vehicle wheel and configured to wirelessly transmit signals indicative of the detected vibrational behavior.

BACKGROUND

Mechanical components are subjected to vibrations in various fields of technology. These vibrations may arise from the normal operation of a component or a machine or a system, but they could also indicate a defect or a failure of the component, machine or system. For example, vibrations occurring in rotating components, such as vehicle wheels, could indicate an imbalance or be indicative of bearing damage.

Regardless of whether the vibrations in question are related to normal operation or are indicative of a fault condition, there is a need to detect the vibrational behavior of such a mechanical component. Sensor modules can be used for this purpose, which sensor modules may include transmitters for wirelessly transmitting signals indicative of the detected vibrational behavior to a remote receiver. A module configured to detect vibration is disclosed in U.S. Pat. No. 9,778,146, the contents of which are hereby incorporated by reference.

Many factors must be taken into account when designing such sensor modules including, for example, easy integration, easy manufacturability, robustness of the module, reliability, and precision of vibration detection. A complex balancing of these factors must be performed to reach a compromise because maximizing one factor, such as robustness, may increase cost and/or decrease the ease of manufacture. On the other hand, increasing the precision of vibration detection may adversely affect the other factors, such as cost and robustness.

There is thus a need to provide a sensor module for detecting a vibrational behavior of a mechanical component that allows for an improved compromise between the above factors, and in particular, that improves vibration detection without adversely affecting cost, robustness and/or ease of manufacture.

SUMMARY

These problems and others are addressed by embodiments of the present disclosure, a first aspect of which comprises a sensor module configured to detect a vibration of a mechanical component. The sensor module includes a base configured to be rigidly mechanically connected to the mechanical component such that a mechanical vibration of the mechanical component is transmitted to the base, at least one spacer extending from the base, the at least one spacer being connected to the base such that the mechanical vibration is transmitted from the base to the at least one spacer, and a circuit board. The circuit board has a first side facing the base and a second side facing away from the base and is connected to the base by the at least one spacer such that the mechanical vibration is transmitted from the at least one spacer to the circuit board. The circuit board includes a circuit and at least one hole. The circuit board is configured to detect the mechanical vibration and, based on the detected mechanical vibration, to wirelessly transmit a signal indicative of the vibration. The at least one spacer comprises a body portion having a first end and a second end spaced from the first end in a length direction and a pin portion projecting from the second end of the body portion. The pin portion extends into the at least one hole, and the body portion is blocked from passing though the at least one hole by contact with a region of the first side of the circuit board surrounding the at least one hole.

Another aspect of the disclosure comprises a sensor module configured to detect a vibration of a mechanical component that includes a base configured to be rigidly mechanically connected to the mechanical component such that a mechanical vibration of the mechanical component is transmitted to the base and a first spacer and a second spacer extending from the base. The first and second spacers are connected to the base such that the mechanical vibration is transmitted from the base to the first and second spacer. The sensor module also includes a circuit board connected to the base by the first and second spacers such that the mechanical vibration is transmitted from the first and second spacers to the circuit board. The circuit board has a first side facing the base and a second side facing away from the base and further includes a circuit and a first hole and a second hole. The circuit board is configured to detect the mechanical vibration and, based on the detected mechanical vibration, to wirelessly transmit a signal indicative of the vibration. Each of the first and second spacers comprises a body portion having a first end lying in a first plane and a second end spaced from the first end in a length direction and lying in a second plane parallel to the first plane and a pin portion projecting from the second end of the body portion. The pin portion has a circular cross section in a direction perpendicular to the length direction and extends into the first hole or into the second hole. The body portion has at least one side wall extending from the first end and is blocked from passing though the first hole or the second hole by contact with a region of the first side of the circuit board surrounding the first hole or the second hole. The at least one spacer further includes a central bore in the first end of the body portion and a curved shoulder connecting the second end of the body portion to the at least one side wall. There is a threaded insert on the pin portion having a bottom in direct contact with the second side of the circuit board.

A further aspect of the disclosure comprises a sensor module configured to detect a vibrational behavior of a mechanical component. The sensor module includes a base configured to be rigidly mechanically connected to the mechanical component in order to absorb a mechanical vibration of the mechanical component and a circuit board including a circuit. The circuit board is configured to detect the mechanical vibration of the mechanical component and, based on the detected vibration, to wirelessly transmit a signal indicative of the vibrational behavior. The module further includes at least one spacer mechanically connecting the circuit board to the base such that the mechanical vibration is transferable from the attachment component to the circuit board. The circuit board and the attachment component are oriented lengthwise along a parallel direction, and the circuit board is disposed relative to the attachment component along a direction perpendicular to the direction of orientation. The at least one spacer comprises a body portion having a first end and a second end spaced from the first end in a length direction and a pin portion projecting from the second end of the body portion, the pin portion being configured to pass through the at least one hole and the body portion being blocked from passing though the at least one hole by contact with a region of a first side of the circuit board facing the attachment component and surrounding the at least one hole.

BRIEF DESCRIPTION OF THE DRAWINGS

These and other aspects and features of the present disclosure will be better understood after a reading of the following detailed description together with the attached drawings, wherein:

FIG. 7 is a side elevational view of one of the spacers of the module of FIG. 2.

FIG. 8 is top plan view of the spacer of FIG. 7.

FIG. 9 is a bottom plan view of the spacer of FIG. 7.

DETAILED DESCRIPTION

Figure 1:
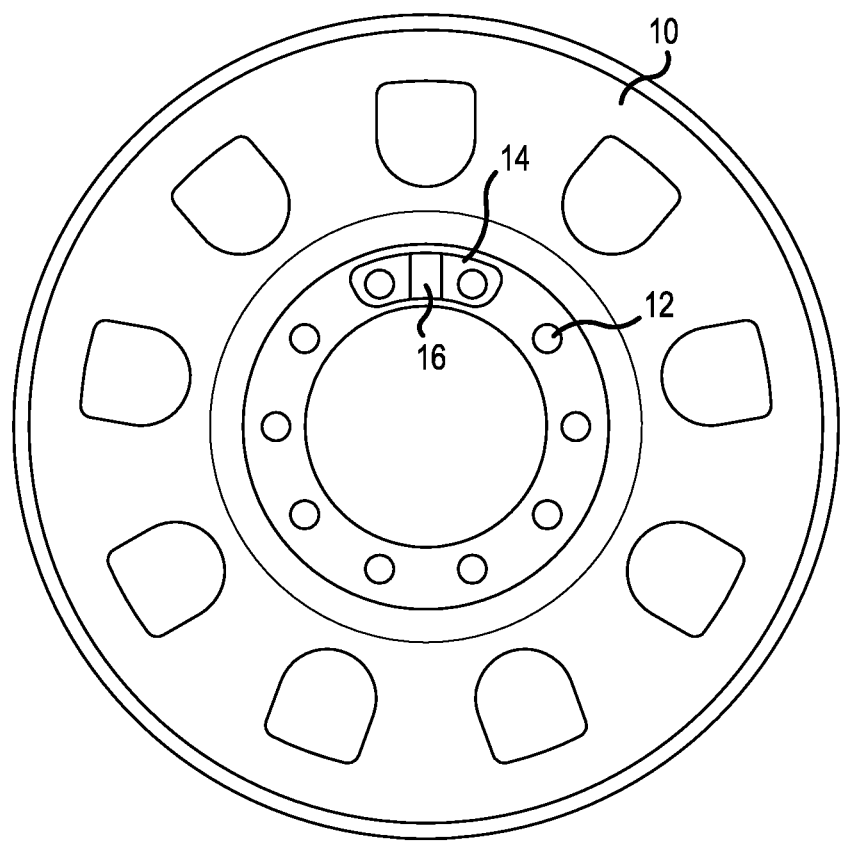
FIG. 1 is a plan view of module according to the present disclosure that includes a base mounted on a wheel and a circuit board connected to the base by two spacers.

Referring now to the drawings, wherein the showings are for purposes of illustrating embodiments of the disclosure only and not for the purpose of limiting same, FIG. 1 shows a wheel 10 having a plurality of lugs 12 and a sensor module 14 according to the present disclosure mounted on two adjacent lugs 12. The sensor module 14 includes a cover 16, and only the cover 16 of the sensor module 14 is visible in FIG. 1.

Figure 2:
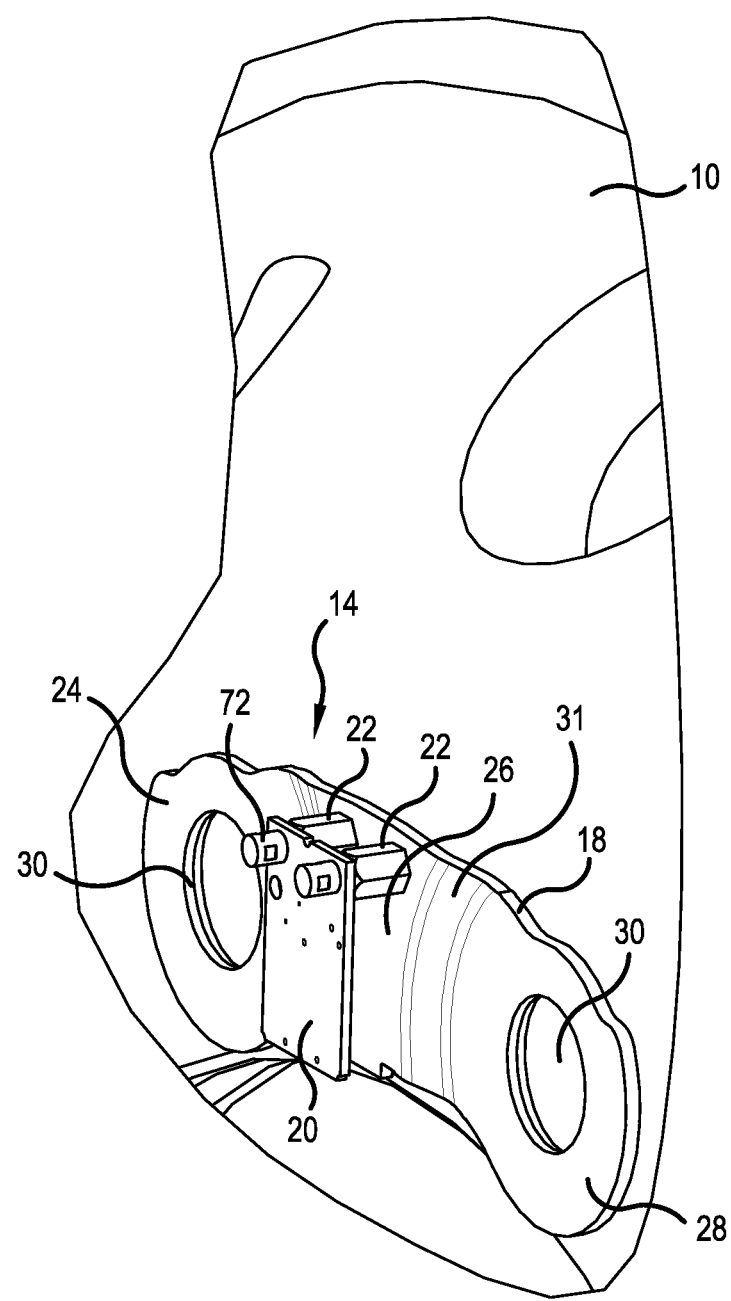
FIG. 2 is perspective view of the module of FIG. 1 with a cover of the module and certain circuit elements removed for illustration purposes.

FIG. 2 shows the sensor module 14 in greater detail and with the cover 16 removed. The sensor module 14 includes a base 18 and a circuit board 20 connected to the base 18 by two spacers 22.

Figure 3:
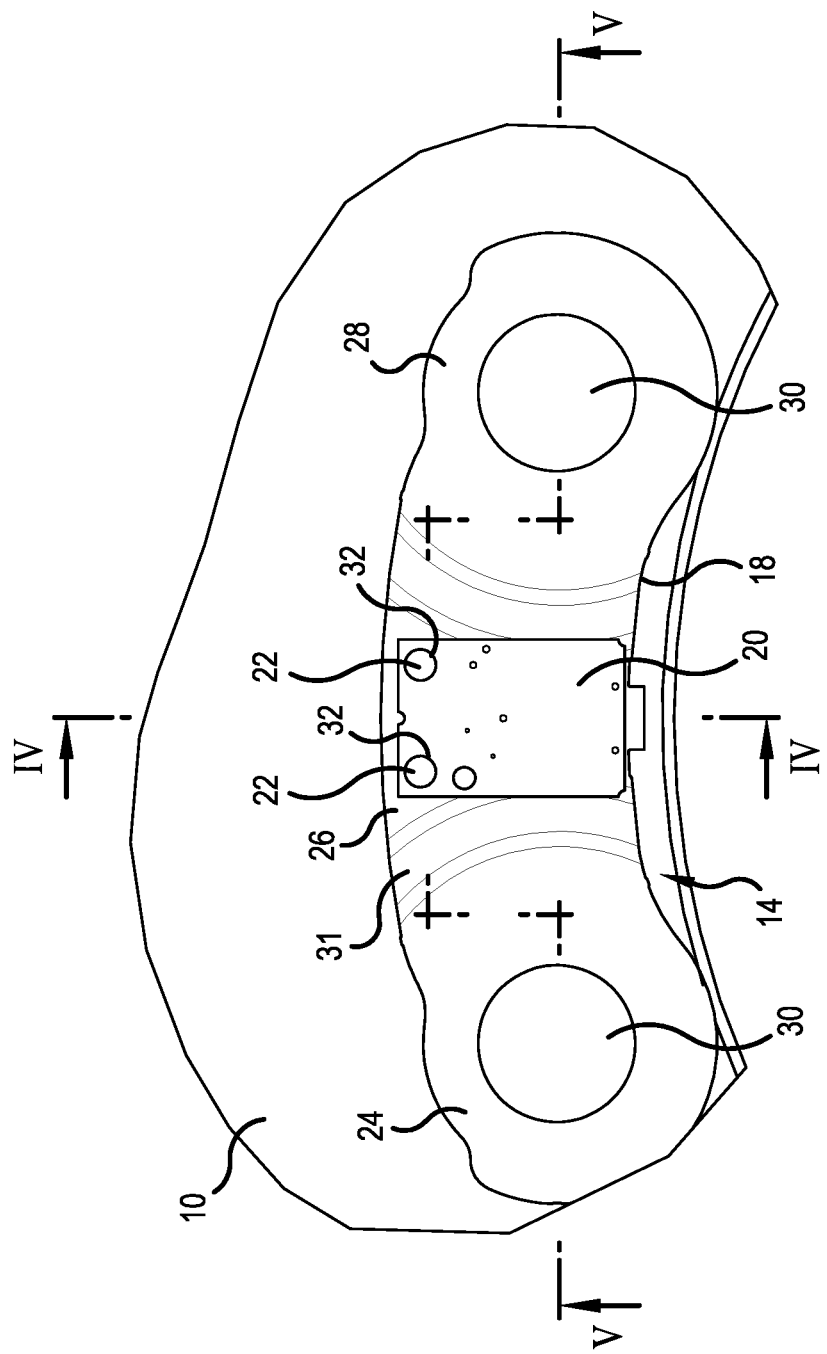
FIG. 3 is a top plan view of the module of FIG. 2.
Figure 4:
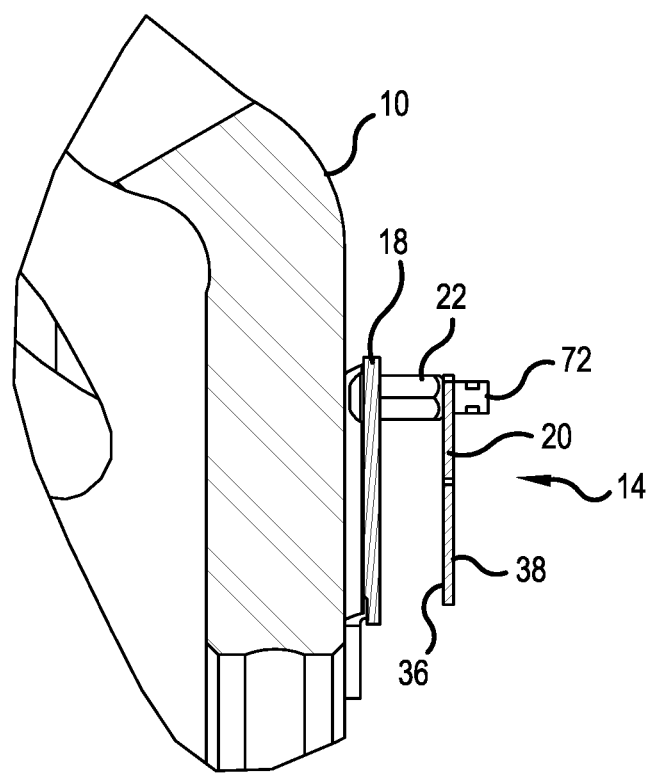
FIG. 4 is a side elevational view taken along line 4-4 in FIG. 3.
Figure 5:
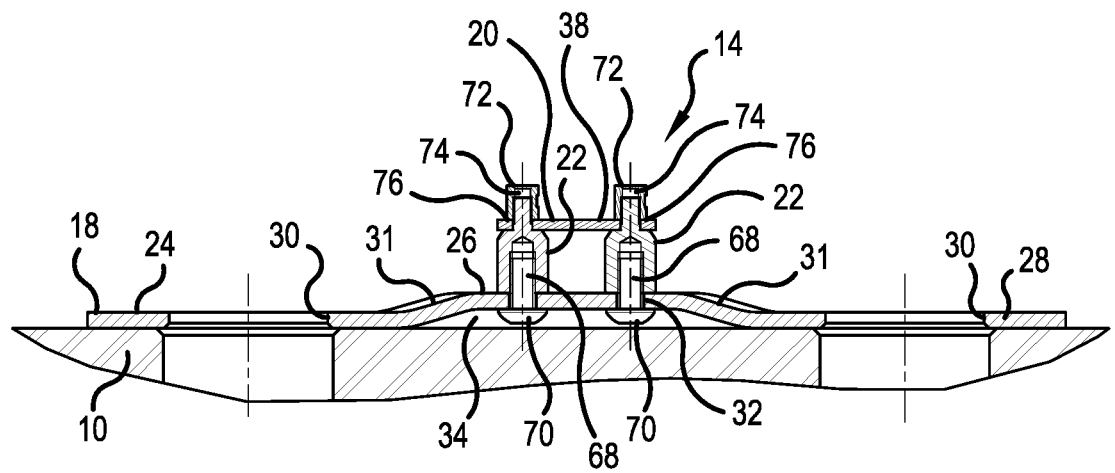
FIG. 5 is a side elevational view taken along line 5-5 in FIG. 3.

Referring now to FIGS. 2 and 3, the base 18 has a first end portion 24, a central portion 26 and a second end portion 28. The first and second end portions 24, 28, lie substantially in a same plane, and each end portion 24, 28 includes an opening 30 configured to receive one of the lugs 12 and to be secured to the wheel 10 by nuts (not illustrated) mounted on the lugs 12. As best seen in FIG. 5, the central portion 26 of the base 18 is offset from the plane of the first and second end portions 24, 28 and connected to the first and second end portions 24, 28 by ramps 31. The central portion 26 also includes first and second holes 32 along one edge thereof at which the spacers 22 are attachable to the base 18. The offset of the central portion 26 creates a gap 34 between the base 18 and the wheel 10 when the base 18 is attached to the wheel 10 for a purpose discussed hereinafter. The direction from the opening 30 in the first end portion 24 to the opening 30 in the second end portion 28 maybe referred to herein as the length of the base 18, and the width of the base 18 is perpendicular to its length and generally aligned with a radius of the wheel 10.

Figure 6:
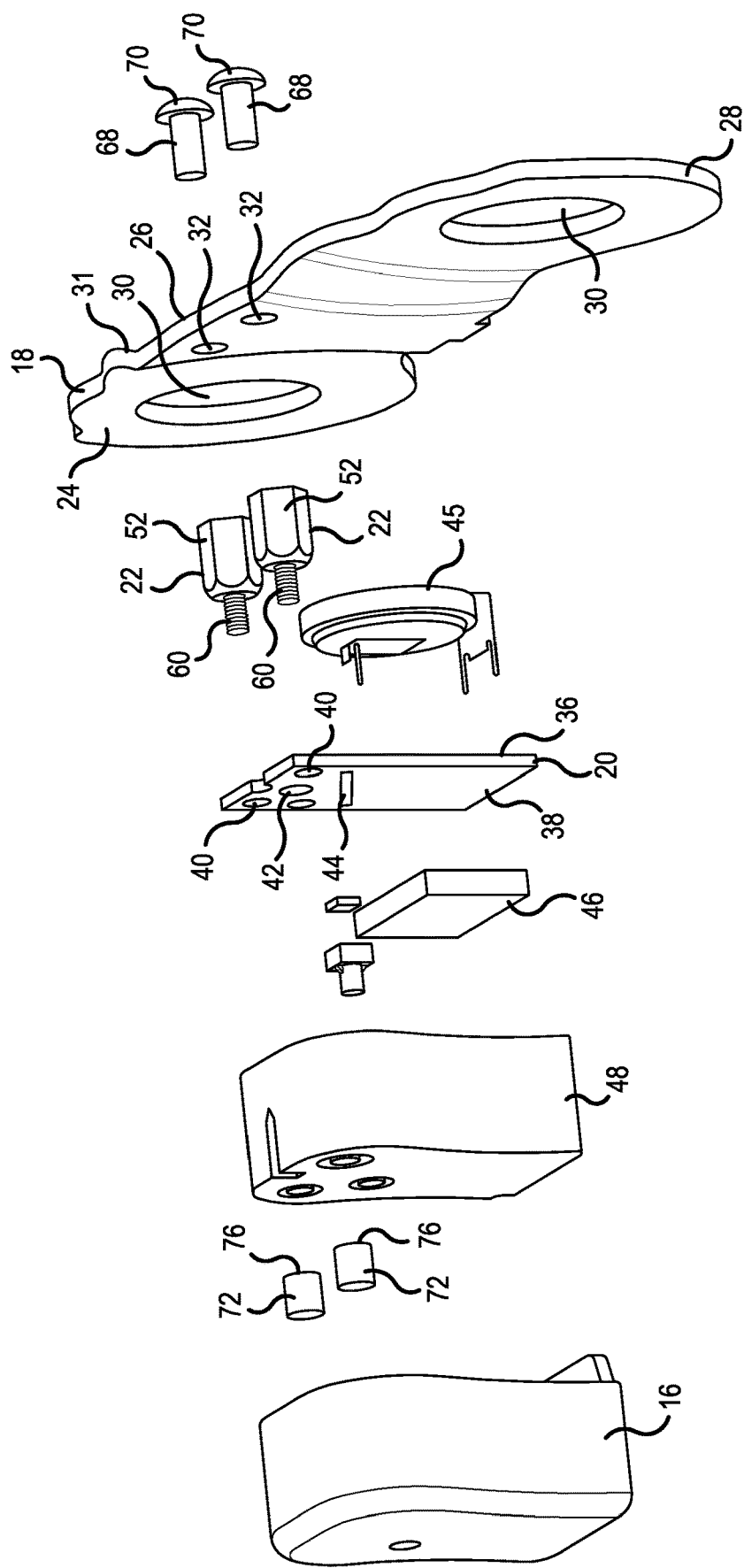
FIG. 6 is an exploded perspective view of the module of FIG. 1.

The circuit board 20 is generally rectangular and includes a first side 36 facing the base 18 and a second side 38 facing away from the base 18. The first and second sides 36, 38 are generally planar and parallel to one another, and a pair of holes 40 extend through the circuit board 20 along one of the short edges thereof. As illustrated in FIG. 6, a first sensor, such as a piezoelectric vibration sensor 42, and a wireless transmitter 44 and an antenna 46 may be mounted to the first side 36 of the circuit board 20, and a battery 45 may be mounted to the second side 38 of the circuit board 20. The piezoelectric vibration sensor 42 is located generally between the holes 40 to minimize the distance that vibrations must travel from the spacers 22 to the sensor 42. Potting material 48 protects the various electronics, and a protective cover 16 covers the potting material 48 and protects the second side 38 of the circuit board 20.

The circuit board 20 is connected to the base 18 by a pair of the spacers 22. While the use of two spacers 22 is preferred, more spacers could be used without exceeding the scope of the disclosure. Because the spacers 22 are identical, only one spacer 22 will be described herein. Each spacer 22 includes a base portion 52 having a first end 54 lying substantially in a first plane and a second end 56 lying substantially in a second plane parallel to the first plane. The base portion 52 is hexagonal in cross section as illustrated, for example, in FIG. 8, and has six side walls 58. A pin 60 projects from the second end 56 of the base portion 52, which pin 60 is threaded and circular in cross section and has a diameter smaller than the smallest width of the base portion 52. Six rounded shoulder portions 62 connect the second end 56 of the base portion 52 to each of the six side walls 58.

FIG. 9 illustrates the first end 54 of the base portion 52 of the spacer 22 and shows that the first end 54 includes a center opening 64. The center opening 64 includes an internal thread to allow threaded fasteners 68, illustrated in FIGS. 5 and 6, to be secured thereto.

With continued reference to FIGS. 5 and 6, the spacers 22 are connected to the circuit board 20 by inserting the pins 60 through the openings 40 in the circuit board 20 and into threaded inserts 72. The inserts 72 each have a threaded hollow interior 74 and a base wall 76. The inserts 72 may be threaded onto the pins 60 like nuts until the base wall 76 comes into contact with the second side 38 of the circuit board 20; however, preferably, the inserts 72 are mounted in the potting material 48, for example, by overmolding, and the inserts 72 thus remain fixed relative to the potting material 48. The spacers 22 are then screwed into the inserts 72 by rotating the spacers 22 relative to the fixed inserts 72, again, until the base wall 76 of the insert 72 comes into contact with the second side 38 of the circuit board 20. The hexagonal shape of the base portion 52 allows the spacer 22 to be rotated using a socket or a wrench or another similar tool.

Next, the spacers 22 and circuit board 20 are connected to the base 18 by inserting the threaded fasteners 68 through the openings 32 in the base portion 18 such that the heads 70 of the threaded fasteners 68 are located in the gap 34 formed by the offset central portion 26 of the base 18 relative to the wheel 10. The center openings 64 of the spacers are placed on the threaded fasteners 68, and the threaded fasteners 68 are screwed into the spacers 22 to secure the spacers to the base 18. The base 18 is then attached to the wheel lugs 12 by suitable lug nuts (not illustrated).

The configuration described above provides for a simple mounting of the circuit board 20 to the base 18 in a manner that allows vibrations to be transmitted from the wheel 10 via the lugs 12 to the base 18, pins 60 and circuit board 20 to the vibration sensor 42 on the circuit board 20. The large first end 54 of the base portion 52 of the spacer 22 is in direct contact with the base 18 and transmits vibrations from the base 18 to the spacer 22. In addition, the heads 70 of the threaded fasteners 68 are in contact with the base 18, and vibrations are transmitted from the base 18 to the threaded fasteners 68 via the heads 70. Furthermore, there is a relatively large area of contact between the threaded fasteners 68 and the interiors of the spacers 22 which further helps to transmit vibrations from the base 18 to the spacers 22. Finally, the presence of the pins 60 of the spacers 22 in the holes 40 of the circuit board 20 and the inserts 72 that are in contact with the pins 60 and the second side 38 of the circuit board 20 provide further transmission paths for vibrations. The improved arrangement described above, therefore, provides for an easy to assembly vibration detection sensor module which efficiently couples vibrations from a wheel-mounted base 18 to the vibration sensor 42 on the circuit board 22.

Figure 12:
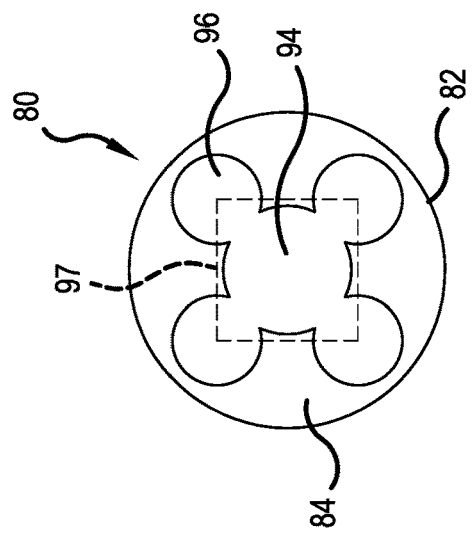
FIG. 12 is a bottom plan view of the modified spacer of FIG. 10.
Figure 11:
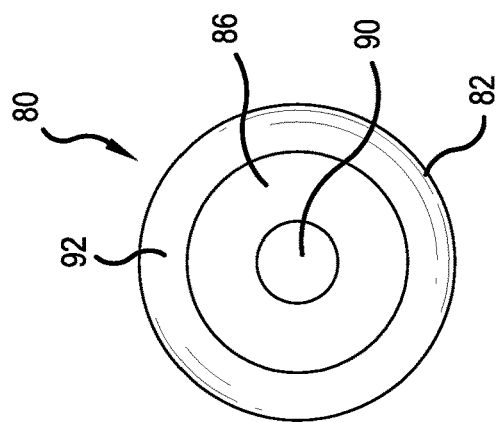
FIG. 11 is a top plan view of the modified spacer of FIG. 10.
Figure 10:
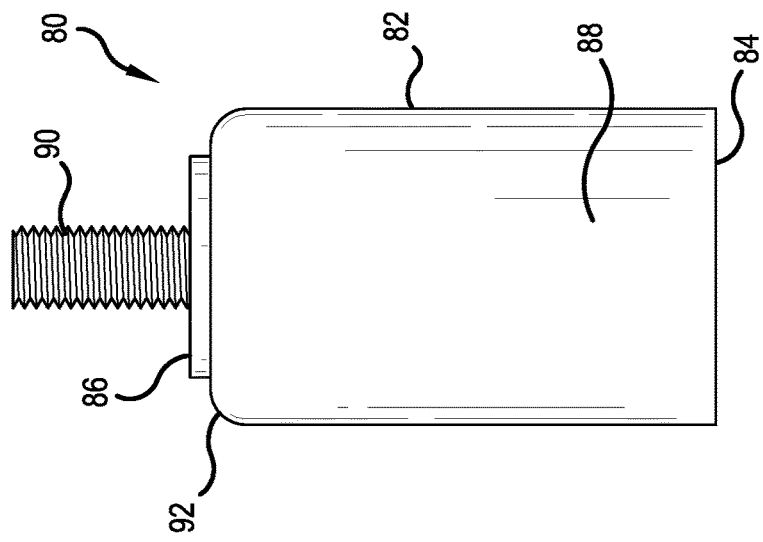
FIG. 10 is a side elevational view of an alternate spacer for use in the module of FIG. 2.

A second embodiment of the present disclosure is illustrated in FIGS. 10-12. This embodiment is substantially identical to the first embodiment discussed above except that the spacers 22 are replaced with modified spacers 80. The shape of the spacers 80 used in this second embodiment are described below.

Each spacer 80 includes a base portion 82 having a first end 84 lying substantially in a first plane and a second end 86 lying substantially in a second plane parallel to the first plane. The base portion 82 is circular in cross section as illustrated, for example, in FIG. 11, and the spacer 80 has a cylindrical side wall 88. A pin 90 projects from the second end 86 of the base portion 82, which pin 90 is threaded and circular in cross section and has a diameter smaller than the diameter of the base portion 82. A rounded shoulder portion 92 connects the second end 86 of the base portion 82 to the cylindrical side wall 88.

FIG. 12 illustrates the first end 84 of the base portion 82 of the spacer 80 and shows that the first end 84 includes a center opening 94 and four surrounding openings 96 that are disposed around the center opening 94. The surrounding openings 96 are arranged in a square and may be described as being located at the four corners of an imaginary square 97 centered on the center opening 94, and the four surrounding openings 96 may touch the center opening 94 such that the center opening 94 communicates with the surrounding openings 96. The diameter of the center opening 94 is somewhat greater than the diameters of the four surrounding openings 96, all of which have approximately the same diameter, and the center opening 94 includes an internal thread to allow threaded fasteners 68, illustrated in FIGS. 5 and 6, to be secured thereto.

The configuration of the spacers 80 of the second embodiment also allow for a simple mounting of the circuit board 20 to the base 18 in a manner that allows vibrations to be transmitted from the wheel 10 via the lugs 12 to the base 18, pins 90 and circuit board 20 to the vibration sensor 42 on the circuit board 22. At least in some environments, the spacers 80 of the second embodiment may be more effective than the spacers 22 of the first embodiment in transmitting vibrations to the vibration sensor 42.

The present invention has been described above in terms of embodiments thereof; modifications and additions to these embodiments will become apparent to persons of ordinary skill in the art upon a reading of the foregoing disclosure. It is intended that all such modifications and additions form a part of the present invention to the extent they fall within the scope of the several claims appended hereto.

What is claimed is:

1. A sensor module configured to detect a vibration of a mechanical component, the sensor module comprising:
    a base configured to be rigidly mechanically connected to the mechanical component such that a mechanical vibration of the mechanical component is transmitted to the base;
    at least one spacer extending from the base, the at least one spacer being connected to the base such that the mechanical vibration is transmitted from the base to the at least one spacer; and
    a circuit board having a first side facing the base and a second side facing away from the base, the circuit board being connected to the base by the at least one spacer such that the mechanical vibration is transmitted from the at least one spacer to the circuit board, the circuit board including a circuit and at least one hole and the circuit board being configured to detect the mechanical vibration and, based on the detected mechanical vibration, to wirelessly transmit a signal indicative of the vibration;
    wherein the at least one spacer comprises a body portion having a first end and a second end spaced from the first end in a length direction and a pin portion projecting from the second end of the body portion, the pin portion extending into the at least one hole and projecting outwardly from the second side of the circuit board, and the body portion being blocked from passing though the at least one hole by contact with a region of the first side of the circuit board surrounding the at least one hole.

2. The sensor module according to claim 1, wherein the first end of the body portion lies in a first plane and the second end of the body portion lies in a second plane parallel to the first plane.

3. The sensor module according to claim 2, wherein the second end of the body portion directly contacts the region of the first side of the circuit board.

4. The sensor module according to claim 3 including a first bore in the first end of the body portion.

5. The sensor module according to claim 3, including a central bore in the first end of the body portion and at least two additional bores in the body portion spaced from the central bore.

6. The sensor module according to claim 5, wherein the pin portion has a circular cross section perpendicular to the length direction and wherein the body portion has a hexagonal cross section perpendicular to the length direction.

7. The sensor module according to claim 2, wherein the body portion includes at least one sidewall extending from the first end and at least one curved shoulder connecting the second end to the at least one sidewall.

8. The sensor module according to claim 7, wherein the at least one sidewall is cylindrical.

9. The sensor module according to claim 1, wherein the at least one spacer comprises a first spacer extending into a first one of the at least one hole and a second spacer extending into a second one of the at least one hole.

10. The sensor module according to claim 1, wherein the sensor module includes a threaded insert connected to the pin portion, the threaded insert having a bottom in direct contact with the second side of the circuit board.

11. The sensor module according to claim 5 wherein the at least two additional bores comprise four additional bores in the first end of the body portion located at vertices of an imaginary square surrounding the central bore.

12. The sensor module according to claim 1 wherein the first end of the body portion includes a central bore and four additional bares located at vertices of an imaginary square surrounding the central bore.

13. The sensor module according to claim 1, wherein the at least one spacer comprises a first spacer and a second spacer, wherein the at least one hole comprises a first hole and a second hole, wherein the circuit includes a piezoelectric vibration sensor and wherein the vibration sensor is located between the first hole and the second hole.

14. The sensor module according to claim 1,
wherein the base includes a first opening and a second opening spaced from the first opening in a longitudinal direction.

15. A vehicle wheel assembly comprising:
a wheel having a first lug and a second lug; and
the sensor module according to claim 14 mounted on the wheel such that the first lug extends through the first opening and the second lug extends through the second opening.

16. A sensor module configured to detect a vibration of a mechanical component, the sensor module comprising:
a base configured to be rigidly mechanically connected to the mechanical component such that a mechanical vibration of the mechanical component is transmitted to the base;
a first spacer and a second spacer extending from the base, the first and second spacers being connected to the base such that the mechanical vibration is transmitted from the base to the first and second spacers; and
a circuit board connected to the base by the first and second spacers such that the mechanical vibration is transmitted from the first and second spacers to the circuit board, the circuit board including a first side facing the base and a second side facing away from the base and further including a circuit, and a first hole and a second hole, the circuit board being configured to detect the mechanical vibration and, based on the detected mechanical vibration, to wirelessly transmit a signal indicative of the vibration;
wherein each of the first and second spacers comprises a body portion having a first end lying in a first plane and a second end spaced from the first end in a length direction and lying in a second plane parallel to the first plane and a pin portion projecting from the second end of the body portion, the pin portion having a circular cross section in a direction perpendicular to the length direction and extending into the first hole or into the second hole and projecting outwardly from the second side of the circuit board, the body portion having at least one side wall extending from the first end and being blocked from passing through the first hole or the second hole by contact with a region of the first side of the circuit board surrounding the first hole or the second hole, the at least one spacer further including a central bore in the first end of the body portion and a curved shoulder connecting the second end of the body portion to the at least one side wall, and a threaded insert on the pin portion having a bottom in direct contact with the second side of the circuit board.

17. The sensor module according to claim 16,
wherein the base includes a first opening and a second opening spaced from the first opening in a longitudinal direction.

18. The sensor module according to claim 17, wherein the circuit includes a piezoelectric vibration sensor and wherein the vibration sensor is located between the first hole and the second hole.

19. A vehicle wheel assembly comprising:
a wheel having a first lug and a second lug; and
the sensor module according to claim 17 mounted on the wheel such that the first lug extends through the first opening and the second lug extends through the second opening.

20. A sensor module configured to detect a vibrational behavior of a mechanical component, the sensor module comprising:
a base configured to be rigidly mechanically connected to the mechanical component in order to absorb a mechanical vibration of the mechanical component;
a circuit board including a first side facing the base and a second side facing away from the base and further including a circuit and at least one hole, the circuit board being configured to detect the mechanical vibration of the mechanical component and, based on the detected vibration, to wirelessly transmit a signal indicative of the vibrational behavior; and
at least one spacer mechanically connecting the circuit board to the base such that the mechanical vibration is transferable from the base to the circuit board,
wherein the circuit board and the base are oriented lengthwise along a parallel direction,
wherein the circuit board is disposed relative to the base along a direction perpendicular to the direction of orientation, and
wherein the at least one spacer comprises a body portion having a first end and a second end spaced from the first end in a length direction and a pin portion projecting from the second end of the body portion, the pin portion being configured to pass through the at least one hole and project outwardly from the second side of the circuit board, the body portion being blocked from passing though the at least one hole by contact with a region of a first side of the circuit board facing the base and surrounding the at least one hole.

\* \* \* \* \*